April 28, 1964   J. C. CHRISTENSON ETAL   3,130,981
DIFFERENTIAL STEERING APPARATUS
Filed June 18, 1962   4 Sheets-Sheet 3

INVENTORS
JOHN C. CHRISTENSON
DAVID H. LINK
BY
ATTORNEYS

April 28, 1964   J. C. CHRISTENSON ETAL   3,130,981
DIFFERENTIAL STEERING APPARATUS
Filed June 18, 1962   4 Sheets-Sheet 4
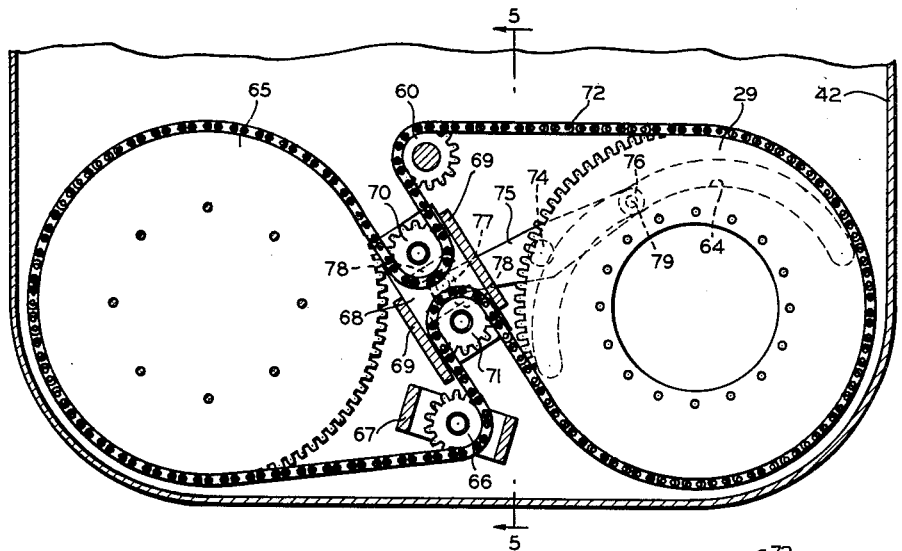
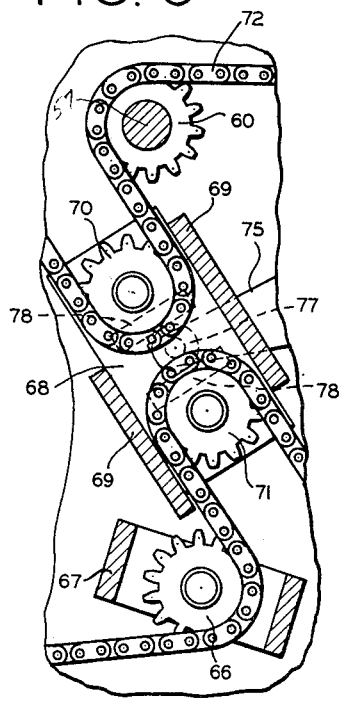
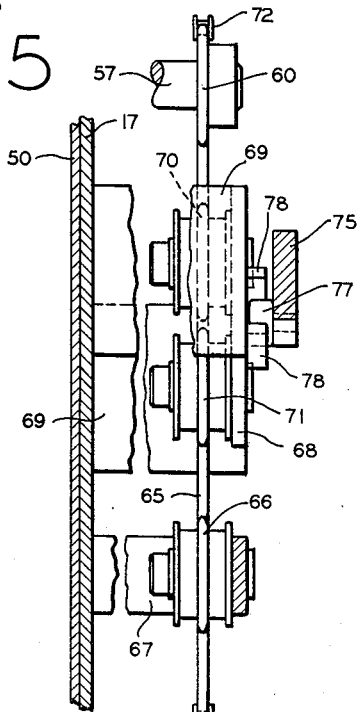
INVENTORS
JOHN C. CHRISTENSON
DAVID H. LINK
BY
ATTORNEYS

United States Patent Office 3,130,981
Patented Apr. 28, 1964

3,130,981
DIFFERENTIAL STEERING APPARATUS
John C. Christenson and David H. Link, Battle Creek, Mich., assignors to Clark Equipment Company, a corporation of Michigan
Filed June 18, 1962, Ser. No. 203,341
3 Claims. (Cl. 280—93)

The present invention relates to apparatus for differential steering of reach or lift trucks, especially trucks of this type for maneuvering in limited areas or confined spaces and commonly referred to as narrow-aisle trucks, and more particularly to a steering mechanism which automatically positions the wheels of a pair of wheels at an angle relative to each other such that both wheels track properly about their prescribed arcs around the steering center.

Narrow-aisle trucks are intended to reduce the space required for storage and/or handling of materials or to allow more efficient utilization of such space by improvement of the maneuverability of the trucks so as to reduce the space required for movement of such trucks. Thus, a truck which can move along an aisle or passage defined by merchandise or other materials stored on either side thereof, and turn to a position at right angles to the stored items at any point along the aisle, within a space only slightly greater than the length of the truck, allows the stored materials on opposite sides of the aisle to be spaced apart only slightly more than the length of the truck, allowing a maximum area of the available space to be utilized for storage and a minimum area to be utilized for the aisle or passage. Similarly, at the intersections of crossing aisles, the material may occupy the space into the very corners of the intersection, since the truck may make a sharp right-angle turn from one aisle into an intersecting aisle with a minimum of clearance being required.

The trucks are normally provided with lifting forks which may be raised and lowered and also horizontally projected and retracted longitudinally of the truck, the design of the truck providing for counterbalancing of a load on the extended forks so as to avoid tipping of the truck. Such trucks commonly have a generally U-shaped frame including forwardly extending legs or outriggers supported by ground-engaging wheels at their forward ends. An upright mast structure and lift fork assembly movable vertically thereon are provided, the lift forks being longitudinally movable for projection forwardly of the outriggers and retraction to a normal position. A framework rearwardly of the outriggers provides support for rear wheel traction means for the truck, control means, and an operator's platform. One widely accepted type of narrow-aisle truck employs two wheels at the rear, one of which is a driving and braking wheel and the other of which is a trail wheel, the two being suitably linked for steering of the vehicle.

The present invention is directed to means for accomplishing differential turning of the two rear wheels so that each will move tangentially of an arc about the steering system center, the inside wheel on each turn of the vehicle being turned more sharply than the outside wheel, thus facilitating steering of the vehicle and enabling turning of the truck within a very small space by shortening the turning radius. Briefly, this is achieved by employing a sprocket chain or the like for turning both of the rear wheels, with a cam arrangement for effecting movement of certain of the sprocket wheels to cause relatively slower or faster directional turning of one of the wheels relative to the other.

It is an object of the present invention to provide apparatus for effecting differential turning of a pair of laterally spaced steerable wheels of a vehicle to allow of a short turning radius enabling sharp turning of the vehicle.

Another object is the provision of apparatus for providing splay in a pair of laterally spaced steerable wheels of a vehicle to facilitate steering and maneuvering of the vehicle and enable sharp, space-saving turns thereof by disposing each of the wheels at a steering angle such that it is substantially tangential to the arc of its travel about the system steering center.

Another object is the provision of a mechanism for turning the wheels of a pair of laterally spaced steerable wheels of a vehicle to different steering angles so as to facilitate turning of the vehicle in either direction and permit of a short vehicle turning radius, by which the inside wheel in any turn of the vehicle is turned more sharply than the outside wheel, regardless of the direction in which the vehicle turns.

It is also an object to provide a differential steering apparatus for a pair of steerable vehicle wheels which effects directional turning of the wheels to positions at an angle to each other and tangential of their respective arcs of travel about the steering center, with the inside wheel on a vehicle turn in either direction turned more sharply from the straight-ahead position than the outside wheel.

A further object is the provision of differential steering apparatus for vehicles which is simple and inexpensive, positive and effective in operation, rugged and trouble-free in use, and requiring a minimum of maintenance.

Other and further objects, advantages and features of the invention will be apparent to those skilled in the art from the following detailed description, taken in conjunction with the accompanying drawings, in which:

FIGURE 3 is an enlarged fragmentary rear elevational view of the truck shown in FIGURES 1 and 2, showing the differential turning mechanism in elevation, with certain parts omitted for clearness;

FIGURE 4 is a plan view of the turning mechanism, taken substantially as indicated by the line 4—4 of FIGURE 3;

FIGURE 5 is a view showing the mechanism in side elevation and taken substantially as indicated by the line 5—5 of FIGURE 4;

FIGURE 6 is an enlarged fragmentary view of a portion of FIGURE 5; and

FIGURE 7 is a somewhat diagrammatic view similar to FIGURE 4, showing a modification of the turning mechanism.

Figure 1:
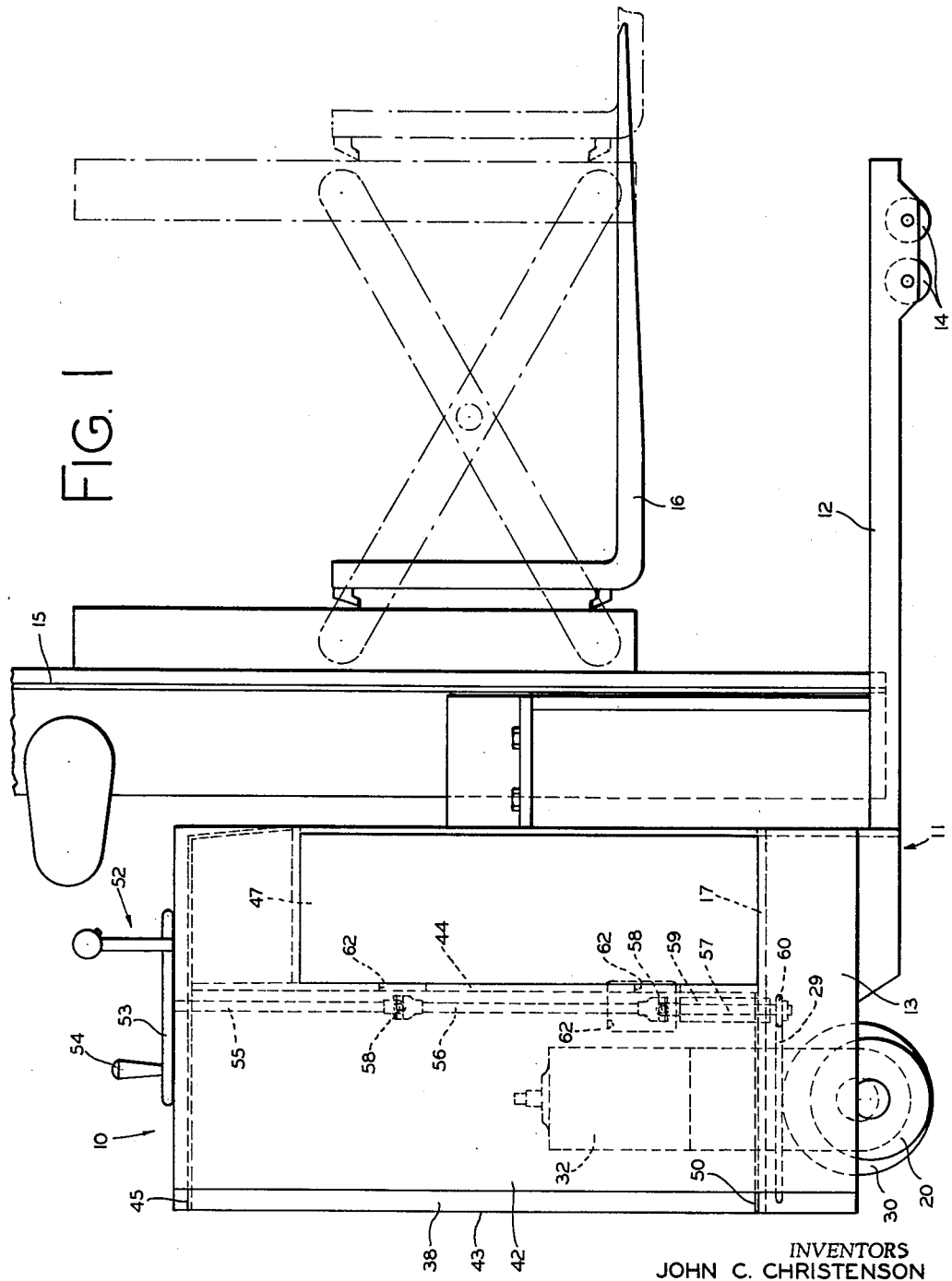
FIGURE 1 is a diagrammatic side elevational view of a narrow-aisle truck embodying the present invention.
Figure 2:
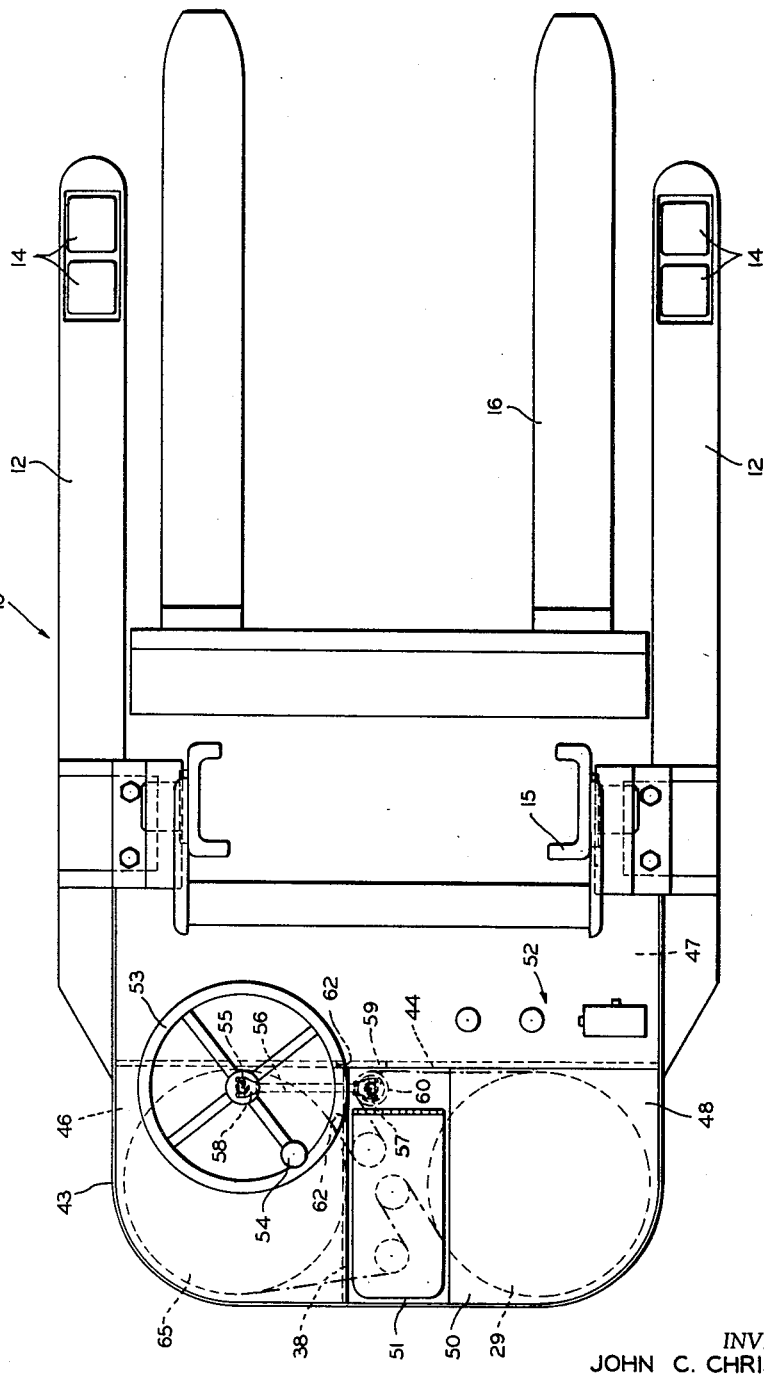
FIGURE 2 is a plan view of the truck illustrated in FIGURE 1.

Referring particularly to FIGURES 1 and 2 of the drawings, a narrow-aisle truck incorporating the present invention is indicated generally at 10, and includes a frame generally indicated at 11, having a pair of parallel horizontal outriggers or legs 12 extending forwardly from a rear framework 13. The legs 12 are supported at their forward ends by ground-engaging load wheels 14 of any suitable type. Adjacent the rear framework 13, the frame 11 supports a mast structure 15 on which is mounted a lift fork assembly 16 movable to desired positions vertically along the mast structure and projectable forwardly and retractable from projected position, by any suitable means, not shown, such as fluid motor means and/or mechanical apparatus. The mast and lifting fork structures may be of any appropriate or desired type, and accordingly are not disclosed in detail.

The rear framework 13 includes a horizontally disposed frame plate 17 spaced above the level of the legs 12 and extending rearwardly of the mast structure. Bolted or otherwise secured to the underside of this frame plate 17 adjacent one side of the truck is a bearing plate 18 below which is mounted a caster 19 including the trail wheel 20, in this case shown as a dual wheel comprised by a pair of wheels 21 rotatably mounted by means of a suitable axle 22 in a caster bracket 23 which at its upper end includes a horizontally extending swivel plate 24 rotatable on a stud 25 or similar member projecting downwardly from the bearing plate 18 and extending through a suitable central aperture in the swivel plate. The caster is secured on the pivot stud 25 by any suitable means, such as a nut 26 threaded on the lower end of the stud. Suitable thrust and anti-friction bearings 27 and 28 are disposed between the bearing plate 18 and the swivel plate 24 to allow easy turning of the trail wheel 20 about the vertical axis provided by the stud 25. Bolted or otherwise secured on the upper face of the swivel plate is a large sprocket wheel 29 of annular form to accommodate the bearings 27 and 28, and centered on the swivel axis.

The rear portion of the frame plate 17 is cut away at the other side of the truck to accommodate the combined driving and braking wheel 30 and its mounting means. The wheel 30, of larger diameter than the trail wheel 20, is driven through suitable gearing extending through housing 31 and connected to the axle of the wheel, from a motor 32 mounted on an upward extension of the housing 31 and fixed relative thereto. The housing 31 includes a mounting bracket plate 33 extending horizontally somewhat below the level of the frame plate 17, and socketed to receive the lower end of a pin 34 which extends vertically upwardly therefrom and has its upper end engaged with the housing 31 below motor 32. The pin 34 projects through a vertical mounting sleeve 35 welded or otherwise secured on the projecting end of a supporting bracket generally designated 36 shown as provided by a vertical support plate 37 braced by horizontal gussets, all welded or otherwise secured on a vertical partition 38 extending upwardly from the frame plate 17 adjacent and substantially parallel to the longitudinal mid-plane of the truck. Opposed chordally extending grooves in the pivot pin 34 and mounting sleeve 35 define a bore in which is received a locking pin or key 39 to lock the pivot pin 32 in the sleeve. A thrust bearing 40 is disposed between the lower end of the mounting sleeve and the bracket plate 33, and anti-friction bearings 41 are provided at the upper and lower ends of the pivot pin 34, to facilitate swivelling of the motor 34, wheel 30, and the connecting gearing and housing about the axis of the pin 34.

As best shown in FIGURES 1 and 2, the truck 10 is provided with a body supported on the rear framework 13, formed by vertical walls 42 and 43 extending upwardly from below the level of the frame plate 17 to any convenient height. The wall 42 at one side of the truck, in this case the right side, terminates short of the rear end of the truck, while the other wall 43 extends from adjacent the mast structure 15 along the side and rear of the truck to the partition 38. The partition 38 extends forwardly from the rear end of the truck to a partition 44 extending transversely of the truck rearwardly of the mast structure. A cover or top plate 45 extends over the generally L-shaped area defined by the partition 38, wall 43, partition 44, and the mast structure. A compartment 46 is defined by the wall 43 and partitions 38 and 44, in which the motor 32 is contained, the bottom of this compartment being open by reason of the aforementioned cuting away of the frame plate 17. A compartment 47 is defined forwardly of the partition 44, for containing storage batteries providing the power for the motor 32. An operator's compartment 48, open at the rear and top, is defined by the partitions 38 and 44 and the side wall 42, in which the operator stands during use of the truck. A platform is provided by a plate 50 overlying the frame plate 17 along the right-hand portion of the compartment, a brake pedal 51 being hinged at the bottom of the left side of the operator's compartment 48, for depression by the operator when it is desired to apply the brake (not shown) to stop driving rotation of the wheel 30. Projecting through the top plate 45 just forwardly of the operator's compartment are a number of control devices generally indicated as 52, for controlling operation of the lift fork mechanism and driving of the truck.

A horizontally disposed steering hand wheel 53 having a vertical handle 54 thereon is at the left of the operator's compartment on a shaft 55 projecting vertically through the top plate 45 out of the motor-containing compartment 46. The steering wheel shaft 55 forms part of a steering mechanism drive shaft which includes an intermediate shaft 56 extending downwardly at an angle from the lower end of shaft 55 into the operator's compartment, and a vertical sprocket shaft which projects through the frame plate 17. The intermediate shaft 56 is connected to the steering wheel shaft 55 and sprocket shaft 57 by universal joints 58 of any suitable type, so that rotation of the shaft 55 by the steering wheel 53 also causes rotation of shaft 56 and of the sprocket shaft 57. The shaft 57 is rotatably mounted in a bearing sleeve 59 so as to effect corresponding rotation of a driving sprocket 60 fast on its lower end and disposed in the same horizontal plane as the sprocket wheel 29. The bearing sleeve projects through a suitable aperture in the frame plate 17, to which it is secured by welding or the like, and is provided with anti-friction bearings 61 to facilitate rotation of the shaft. The shaft 55 may be connected to the steering hand wheel 53 by suitable gearing or other means, if desired, to multiply the force applied to the steering wheel. The partitions 38 and 44 are suitably apertured as indicated at 62 to accommodate passage of the shaft 56 and rotation of the universal joints 58.

The swivel plate 24 has formed therein a cam slot 64 (FIGURE 5) of curvilinear form substantially as shown, and explained more fully hereinafter. Secured as by bolts to the lower face of the bracket plate 33 of the gear housing 31 and motor 32, coaxially with the pivot pin 34, is a sprocket wheel 65 of the same radius as the sprocket wheel 29, and extending in the same horizontal plane. As best shown in FIGURE 5, the drive sprocket 60 is disposed between the sprocket wheels 29 and 65, and in this instance has substantially a common tangent therewith. An idler sprocket 66 is mounted intermediate the sprocket wheels 29 and 65 and in the same horizontal plane, but in spaced relation to the sprocket 60, by means of a bracket 67 secured on the truck framework 13. The idler sprocket 66 is preferably also an adjusting or take-up sprocket. Disposed centrally of the sprocket wheels 29 and 65 and sprockets 60 and 66 and below the plane thereof is a slide block or carrier 68 engaged with guides 69 secured on the truck frame for rectilinear movement in a horizontal plane in a direction shown in this instance as substantially normal to a line passing through the centers of the sprocket 60 and sprocket wheel 65. Carried by the slide block 68 on suitably spaced vertical rotational axes are idler sprockets 70 and 71, disposed in the same horizontal plane as the sprocket wheels 29 and 65. Trained about the sprockets and sprocket wheels is a sprocket chain 72, both runs of the chain between the sprockets wheels 29 and 65 extending between the sprockets 70 and 71, one run being reeved about the drive sprocket 60 and idler sprocket 10, and the other run being trained about the idler sprocket 66 and the idler sprocket 71 on the slide 68. As will be evident particularly from FIGURE 4, the idler sprocket 70 is disposed nearer the drive sprocket 60 and sprocket wheel 65 than is the sprocket 71, and engages with the sprocket chain 72 between the drive sprocket and sprocket wheel 65. Similarly, the idler sprocket 71 is disposed nearer the sprocket wheel 29 and idler sprocket 66 than is the sprocket 70 and engages the chain between sprocket 66 and sprocket wheel 29.

Pivoted on a suitable bracket 73 on the framework 13 below the level of the swivel plate 24 of the trail wheel caster bracket, as at 74, is a cam lever 75 which may advantageously be formed with vertically offset end portions, on the upper of which is journaled a cam-following roller 76 engaged in the cam slot 64 of the swivel plate. On the other end of the lever 75 is journaled a roller 77 engaged between transverse lugs 78 depending from the lower face of the slide block 68. It will be apparent that as the lever 75 is swung in one direction or the other, its engagement with the sprocket carrier or slide block 68 by means of the roller 77 and lugs 78 will effect rectilinear movement of the block in the guides 69. The engagement of the roller 77 between the guide lugs 78 on the slide block 68 allows movement of the roller transversely relative to the block, to allow for the difference between the arcuate path of the roller 77 about the lever pivot 74 and the rectilinear movement imposed upon the slide block by its guides 69. Of course, other means might be used for this purpose. Swinging of the lever is effected by rotation of the sprocket wheel 29, which by reason of the shape of the cam slot 64 in the swivel plate 24 fixed thereto causes movement of the follower roller 76 engaged in the slot radially inwardly or outwardly relative to the sprocket wheel 29, the roller 77 on the other end of the lever 75 being moved correspondingly. The cam 64 has a neutral point 79 at which the follower 76 rests when the wheels 20 and 30 are in substantially parallel, straight-ahead position, the neutral point thus in one sense corresponding to the straight-ahead wheel position. It will be evident from the description of the construction hereinbefore given that rotation of either of the sprocket wheels 29 or 65 results in corresponding turning or swiveling of the respectively associated wheels 20 and 30, so that the vehicle may be turned, or steered, in either direction. It may be explained that the wheels 20 and 30, being at the rear of the truck 10, are turned or cocked toward the right, or clockwise, when a turn to the left by the vehicle is desired, and similarly the wheels are turned toward the left, or counterclockwise, when it is desired to make a right turn with the truck.

Accordingly, to turn the truck to the left, the drive sprocket 60 is rotated clockwise to turn the sprocket wheels 29 and 65 in the same clockwise direction; and is rotated counterclockwise when the truck is to be turned to the right. Rotation of the drive sprocket 60 is accomplished by rotation of the steering hand wheel 53 to effect clockwise or counterclockwise rotation of the shafts 55, 56 and 57, it being noted that the steering wheel is turned in the direction opposite that in which the truck is to turn. Upon clockwise rotation of the drive sprocket 60, the sprocket wheels 29 and 65 are similarly rotated in a clockwise direction by means of the chain 72, and being the same size would turn at the same speed in the absence of the steering mechanism of this invention. As the sprocket wheel 29 rotates, the cam follower roller 76 is moved generally radially of the sprocket wheel 29 by reason of its engagement in the cam slot 64. Assuming that the wheels 20 and 30 are directed straight ahead for rectilinear movement of the truck at the beginning of the rotation of the steerable wheel 20 associated with the sprocket wheel 29, the roller 76 will be at the neutral point 79 of the cam, and will be moved radially outwardly of the sprocket wheel and the vertical swivel axis of the trail wheel 20. This, of course, causes the opposite end of the lever 75 to swing in the opposite direction, thus shifting the slide block 68 along the guides 69 in a direction away from the sprocket wheel 65 and sprocket 60. The chain 72 is thus subjected to a force between the sprocket wheel 65 and sprocket 60 tending to draw it clockwise about the sprocket wheel and counterclockwise about the drive sprocket 60. The counterclockwise movement of the chain about the drive sprocket being contrary to the direction of drive of the sprocket, the chain does not move counterclockwise about the drive sprocket, but is moved clockwise about sprocket wheel 65, the idler sprocket 70 rotating more rapidly counterclockwise as it is moved with the slide block than if its carrier block remained stationary. The clockwise movement of the chain about sprocket wheel 65 due to the foregoing movement of the idler sprocket 70 represents a component additional to that caused by the rotation of the drive sprocket 60, so that the chain moves more rapidly about sprocket wheel 65 than about the sprocket wheel 29, and since the chain movement of course involves corresponding movement of the sprocket wheel, the sprocket wheel 65 is rotated clockwise more rapidly than the sprocket wheel 29. The idler sprocket 71 also rotates more rapidly during movement of the slide block than it would if it were not moved, thus in effect paying out the chain more rapidly to move clockwise about the sprocket 66 and sprocket wheel 65 and compensate for the more rapid drawing in of the chain by sprocket 70.

It will thus be apparent that only the portion of the chain between the sprockets 70 and 71 trained about sprocket wheel 65 and sprocket 66 is affected by the movement of the slide block 68 and the sprockets 70 and 71 carried thereby. The portion of the chain extending about the sprocket wheel 29 moves throughout its extent at a substantially constant rate determined by the speed of rotation of the drive sprocket 60, the sprocket wheel 29 thus turning at a corresponding substantially constant speed. The drive wheel 30, it will be evident, is turned clockwise about its vertical swivel axis by the sprocket wheel 65 more rapidly than the trail wheel 20 is rotated by means of its sprocket wheel 29, so that the drive wheel is turned more sharply than the trail wheel, and thus its central axis, or in other words, the axis of its axle, extends at a more acuate angle to the longitudinal axis of the truck than does the central axis of the trail wheel. The difference in steering angle of the wheels 30 and 20 which results from the differential turning or swivelling thereof corresponds to the difference in the arcs they decribe about the steering system center. In other words, each of the wheels travels through its arcuate path about the steering center in substantially tangential relation to the arc of travel, the central axes of the wheels intersecting substantially at the steering center. The wheels thus move easily through the paths prescribed in any particular turn of the vehicle, are subjected to less wear, and hold to the shortest possible path in any turn, avoiding any tendency to swing or turn in a longer path due to swinging through an arc of greater radius than is absolutely necessary, which of course would require more space for turning of the vehicle and reduce its maneuverability.

It the truck is to be turned to the right, the drive sprocket 60 is rotated counterclockwise to turn the sprocket wheels 29 and 65 in the same counterclockwise direction through the chain 72. From the neutral point of the cam, the follower roller 77 is again moved radially outwardly from the swivel axis of the wheel 20, and the lever 75 is swung to move the slide block 68 in its guides 69 in a direction away from the sprocket wheel 65 and drive sprocket 60, as in the case of the clockwise rotation of the sprocket wheels to effect a left turn of the vehicle. As before, the idler sprocket 70 carried by the block 68 pulls the chain 72 in a direction clockwise of the sprocket wheel 65 and counterclockwise of the drive sprocket 60, but since the drive sprocket is rotated at a substantially constant speed, or at a speed controlled by the rotation of the steering wheel 53, there is again no effect on the movement of the chain about the drive sprocket. There is, however, a component of movement of the chain clockwise about the axis of the sprocket wheel 65, which is opposite to the counterclockwise movement of the chain and the counterclockwise rotation of the sprocket wheel. The result is that the rotation of sprocket wheel 65 is slowed relative to the speed of rotation of the sprocket wheel 29, so that the wheel 30 is turned more slowly to its steering position than is the trail wheel 20, which thus turns or swivels more rapidly than the wheel 30 and therefore achieves a sharper steering angle than the wheel 30. In this case, involving steering or turning of the truck to the right, the trail wheel 20 is the inside wheel on the turn, and thus properly is turned more sharply than the outside or drive wheel. As in the case of the left turn, the idler sprocket 71, being moved in the direction of the space between the sprocket wheel and idler sprocket 66, compensates for the clockwise component of movement of the chain, in this case resulting in a slower counterclockwise movement about the sprocket wheel 65 and idler 66, and slower clockwise movement about the idler 71, instead of faster counterclockwise movement about the sprocket 71 and faster clockwise passage about the sprocket 66 and sprocket wheel 65. The same results of easy movement of the wheels, minimization of wear, and improved maneuverability are, of course, achieved in turning of the vehicle to the right as in a left turn.

It will be apparent that without provision for splay or difference in steering angles between the two wheels, the wheels would be in substantially parallel relation throughout the turn by the vehicle, so that each would travel in an arc described about a different center from the other wheel, and thus could not effect as sharp a turn of the vehicle as with the differential steering mechanism disclosed herein. In addition, they could not move as easily through their respective arcs, would be subjected to greater friction and therefore increased wear due to the tendency of each to move laterally relative to the other in traveling through its turning path, and would have to move in an arc greater than the minimum possible in any particular turn of the truck.

It will be appreciated that because the steering wheels are at the rear of the truck, they are swiveled to a position opposite that in which the vehicle is to turn, as previously explained, so that the steering hand wheel 53 is turned clockwise when the vehicle is to be turned to the left, or counterclockwise, and similarly the wheel is turned counterclockwise when the vehicle is to turn to the right. This is common in trucks of this type, but if it is desired to turn the hand wheel in the same direction as the truck, it would be necessary only to provide another idler sprocket between the sprocket 70 and the drive sprocket 60 and reverse the reeving of the chain about sprocket 60, so as to reverse the direction of movement of the chain relative to the rotation of the drive sprocket from that effected by the arrangement illustrated in FIGURE 5. Clockwise rotation of the drive sprocket 60 would then cause counterclockwise rotation of the sprocket wheels 29 and 65. This is a known expedient in the art. On the other hand, if the differential steering mechanism were applied to forward wheels of the vehicle instead of the rear wheels, it will be obvious that the hand steering wheel 53 would be turned in the direction in which it was desired to turn the vehicle, without requiring the addition of any reversing idler sprocket. Similarly, when the truck is driven in reverse, the hand steering wheel is turned in the direction in which the vehicle is to be steered. It will be evident that the difference in steering angle of any pair of laterally spaced steerable wheels effected by the steering mechanism of the invention is such that the wheels are disposed in planes diverging forwardly during a forward turn if the wheels are forward wheels, and in planes converging forwardly if the wheels are rear wheels.

It will be apparent also that the steering mechanism as disclosed might be reversed in its application to the sprocket wheels 29 and 65, so that the sprocket wheel 65 would be rotated at the rate determined by rotation of the drive sprocket 60, and the sprocket wheel 29 would be rotated on its swivel axis at a faster or slower speed than the sprocket wheel 65. In the present instance, however, the trail wheel 20 being of less diameter than the drive wheel 30, there is more space below the frame plate 17 adjacent the trail wheel than there is adjacent the drive wheel to accommodate the cam and the lever 75.

It will be noted that the cam 64 in this case is shown as of curved, more or less arcuate form, defined by two arcuate sections extending in opposite directions from the neutral point 79, each being generally arcuate and extending through substantially 90 degrees, but about different centers. The difference in the arcs of the two sections or portions of the cam slot 64 results from the greater turning movement of one wheel relative to the other in turning of the vehicle in one direction or the other. Instead of the roller connection between the lever 75 and the slide block 68, a link may be interposed between the block and the adjacent end of the lever to effect movement of the block 68 by swinging of the lever upon rotation of the sprocket wheel 29. Similarly, if desired, the lever 75 may be engaged with or connected to the sprocket wheel 29 for oscillation thereby otherwise than by the cam means disclosed.

In FIGURE 7, there is illustrated more or less diagrammatically another arrangement for effecting the differential rotation of the sprocket wheels to obtain differential steering. The sprocket wheels 29 and 65, driving and idler sprockets 60 and 66, and the sprocket chain 72 are provided as hereinabove described. A slide block 80 similar to the block 68 is mounted between the sprocket wheels 29 and 65 for movement in suitable guides (not shown) transversely of a line joining the centers of the sprocket wheels. Rotatably mounted on the block 80 in spaced relation to each other are idler sprockets 81 and 82, generally similar to the sprockets 70 and 71, respectively. In the present instance, additional idler sprockets 83 and 84 are suitably mounted one adjacent the drive sprocket 60 and sprocket wheel 65, and the other adjacent the adjustable idler sprocket 66 and sprocket wheel 29. The sprockets are located in the relation shown in FIGURE 7, so that one run of the chain 72 may extend from the sprocket wheel 29 about the driving sprocket 60 and doubled about sprocket 81 on the slide block 80, then about the sprocket 83 and sprocket wheel 65. The other run of the chain extends from sprocket wheel 29 around idler sprocket 84 and sprocket 82, doubling back from the latter to pass about the sprocket 66 to the sprocket wheel 65. A link 85 has one end pivotally connected as at 86 to the slide block 80, and the other to an end of a lever 87 pivoted as at 88 on a fulcrum member 89 suitably secured to the vehicle. The other end of the lever 87 is pivotally connected to one end of a link 90, the other end of which is pivoted on the sprocket wheel 29 eccentrically thereof, as at 91, as will be clear from FIGURE 7.

It will be evident that as the sprocket wheel 29 is rotated, the link 90 will be caused to swing about its pivot 91, by reason of its connection at 92 to the lever 87, thus by reason of its connection to the lever causing the latter to swing about its pivot 88, thus shifting the link 85 in one direction or the other. The slide block 80 therefore is moved in one direction or the other in its guides, to draw the sprocket chain 72 in the same manner as in the case of the slide block 68 and the sprockets 70 and 71, and effect faster or slower turning of the sprocket wheel 65 relative to the sprocket wheel 29, as has been explained above. To avoid the link 90 and lever 87 coming to a dead center position or "breaking" in the wrong direction, the length of the link 90 plus the spacing of the pivotal connection 92 from the pivot axis 88 of the lever 87 is made greater than the spacing between the axis 88 and the pivot 91 of link 90 when they lie on a common line passing through the axis of sprocket wheel 29. Differential turning of the wheels 20 and 30 is thus achieved by the mechanism of FIGURE 7 substantially as by the first-disclosed arrangement.

It will be apparent that the idlers 83 and 84 are not essential to the operation of the turning mechanism, being employed merely to guide or dispose the sprocket chain in a desired path, and may therefore be dispensed with if desired. Furthermore, the adjusting idler sprocket 66 may be eliminated from the mechanism of both FIGURE 4 and FIGURE 7; and the driving sprocket 60 also may be omitted, as pointed out herebelow. On the other hand, the sprockets 83 and 84 may be included in the mechanism of FIGURE 4, if desired, along with the sprockets 60 and 66. Driving of the turning mechanism of either FIGURES 4 or 7 may be by means connected to either of the sprocket wheels 29 and 65, or to any of the idler sprockets 66, 83, and 84 which may be incorporated in the mechanism, or by other means, and the driving sprocket 60 may therefore be eliminated, or be employed simply as an idling sprocket.

It should also be apparent that while the apparatus of this invention has been disclosed as employing sprocket wheels and a sprocket chain, other circular members and endless flexible means might be substituted therefor, such as a suitable pulley and belt arrangement, or other equivalent arrangements might be provided.

While the invention is specifically disclosed as applied to a materials handling truck, and particularly a narrow-aisle truck, it will be obvious that it may be applied to other types of vehicles.

It is to be understood that the disclosed embodiments of the invention are illustrative and exemplary, and that the invention is not limited to the particular forms and relationships set forth, since many variations and modifications may be made without departing from the scope of the inventive concept.

We claim:

1. Differential steering mechanism for a narrow-aisle truck or the like having a pair of laterally spaced steerable ground-engaging wheels each rotatable about a vertical swivel axis for turning of the truck, comprising first and second sprocket wheels each rotatable on said vertical axis of one of said steerable wheels and operatively connected thereto for directional turning of the wheel, a cam on the first sprocket wheel having an intermediate point corresponding to straight-ahead position of the steerable wheels, a carrier, a pair of idler sprockets on said carrier in fixedly spaced relation to each other, means mounting the carrier for rectilinear reciprocation transversely of the common plane of the sprocket wheel axes, a lever pivoted intermediate its ends on the truck, a cam follower on one end of said lever engaging said cam, means connecting the carrier to the other end of the lever for reciprocation thereby, a sprocket chain reeved about the first and second sprocket wheels with one run also reeved about one of said pair of idler sprockets and the other run also reeved about the other of said pair of idler sprockets, both of the chain runs passing between the idler sprockets, and means for rotating the sprocket wheels, said cam and lever being arranged to effect movement of the carrier upon movement of said follower from said intermediate point by either clockwise or counterclockwise rotation of the sprocket wheels for accelerating rotation of the second sprocket wheel in one direction to increase the speed thereof to more than that of the first sprocket wheel and for decelerating rotation of the second sprocket wheel in the other direction to reduce the speed thereof to less than that of the first sprocket wheel for effecting rotation of the steerable wheel associated with the second sprocket wheel faster or slower than the other steerable wheel as said associated steerable wheel is the inside or outside wheel in turning of the truck.

2. Differential steering mechanism for a narrow-aisle truck or the like having a pair of laterally spaced steerable ground-engaging wheels each rotatable about a vertical swivel axis for turning of the truck, comprising first and second sprocket wheels each rotatable on said vertical axis of one of said steerable wheels and operatively connected thereto for directional turning of the wheel, a carrier, a pair of idler sprockets on said carrier in fixedly spaced relation to each other, means mounting the carrier for rectilinear reciprocation transversely of the common plane of the sprocket wheel axes, a lever pivoted intermediate its ends on the truck at a point spaced from the sprocket wheels, a link pivoted at one end on the first sprocket wheel eccentrically thereof and at the other end to one end of the lever, means connecting the carrier to the other end of the lever for reciprocation thereby, a sprocket chain reeved about the sprocket wheels having two runs passing between said pair of idler sprockets with one run reeved about one of said idler sprockets and with the other run reeved about the other of said idler sprockets, and means for rotating the sprocket wheels, said link and lever being arranged to effect movement of the carrier by either clockwise or counterclockwise rotation of the sprocket wheels for accelerating rotation of the second sprocket wheel in one direction to increase the speed thereof to more than that of the first sprocket wheel and for decelerating rotation of the second sprocket wheel in the other direction to reduce the speed thereof to less than that of the first sprocket wheel for effecting rotation of the steerable wheel associated with the second sprocket wheel faster or slower than the other steerable wheel as said associated steerable wheel is the inside or outside wheel in turning of the truck.

3. Differential steering mechanism for a vehicle having a pair of laterally spaced steerable ground-engaging wheels each rotatable about a vertical swivel axis for turning of the vehicle, comprising first and second sprocket wheels each rotatable on said vertical axis of one of said steerable wheels and operatively connected thereto for directional turning of the wheel, carrier, a pair of idler sprockets on said carrier in fixedly spaced relation to each other, means mounting the carrier for rectilinear reciprocation transversely of the common plane of the sprocket wheel axes, a sprocket chain reeved about the sprocket wheels having two runs extending between said idler sprockets with one run reeved about one of the idler sprockets and the other run reeved about the other of the idler sprockets, means for rotating the sprocket wheels, a lever pivoted on the truck, means pivotally connecting one end of said lever to the first sprocket wheel eccentrically thereof, and means operatively connecting the carrier to the other end of the lever to effect movement of the carrier by either clockwise or counterclockwise rotation of the sprocket wheels for accelerating rotation of the second sprocket wheel in one direction to increase the speed thereof to more than that of the first sprocket wheel and for decelerating rotation of the second sprocket in the other direction to reduce the speed thereof to less than that of the first sprocket wheel for effecting rotation of the steerable wheel associated with the second sprocket wheel faster or slower than the other steerable wheel as said associated steerable wheel is the inside or outside wheel in turning of the truck.

References Cited in the file of this patent

UNITED STATES PATENTS

| | | |
|---|---|---|
| 1,801,043 | Harber et al. | Apr. 14, 1931 |
| 2,352,797 | Miller | July 4, 1944 |
| 2,713,918 | Framheim | July 26, 1955 |
| 2,913,063 | Brown | Nov. 17, 1959 |
| 2,995,380 | King | Aug. 8, 1961 |
| 3,018,116 | Summers et al. | Jan. 23, 1962 |
| 3,068,019 | Ulinski | Dec. 11, 1962 |